US010531724B2

(12) United States Patent
Woodhams et al.

(10) Patent No.: US 10,531,724 B2
(45) Date of Patent: Jan. 14, 2020

(54) BELT CLIP FOR POWER TOOL

(71) Applicant: TTI (MACAO COMMERCIAL OFFSHORE) LIMITED, Macau (MO)

(72) Inventors: Todd Eric Woodhams, Anderson, SC (US); Mo Bo Xiong, Dongguan (CN)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 0 days.

(21) Appl. No.: 15/937,515

(22) Filed: Mar. 27, 2018

(65) Prior Publication Data

US 2018/0279752 A1 Oct. 4, 2018

Related U.S. Application Data

(60) Provisional application No. 62/581,106, filed on Nov. 3, 2017, provisional application No. 62/478,394, filed on Mar. 29, 2017.

(51) Int. Cl.
*A45F 5/02* (2006.01)
*B25F 5/02* (2006.01)
(Continued)

(52) U.S. Cl.
CPC ............... *A45F 5/021* (2013.01); *B25F 5/02* (2013.01); *H01M 2/1022* (2013.01);
(Continued)

(58) Field of Classification Search
CPC ............ A45F 5/021; A45F 2200/0575; Y10S 224/904; Y10T 24/1394
(Continued)

(56) References Cited

U.S. PATENT DOCUMENTS 5,054,170 A * 10/1991 Otrusina ............... A45F 5/02
224/197
5,248,072 A * 9/1993 Jones ..................... A45F 5/14
224/247
(Continued)

FOREIGN PATENT DOCUMENTS

CA  2 561 870 A1  10/2005
CA  2 561 940 A1  10/2005
(Continued)

OTHER PUBLICATIONS

European Patent Office Search Report for Application No. 18165114.2 dated Aug. 21, 2018, 11 pages.
(Continued)

*Primary Examiner* — Brian D Nash
(74) *Attorney, Agent, or Firm* — Michael Best & Friedrich LLP

(57) ABSTRACT

A belt clip for use with a power tool. The power tool includes a tool housing, a battery receptacle positioned adjacent the tool housing, and a battery selectively received within the battery receptacle. The belt clip includes a body with a first member that has a first portion and a connecting portion. The first portion is received in a complementary groove on an interior surface of the battery receptacle, and the connecting portion is substantially perpendicular to the first portion and is configured to extend between the battery receptacle and the battery. The body also includes a second member that is coupled to the first member. The second member is configured to be spaced apart from an exterior of the power tool.

8 Claims, 8 Drawing Sheets

(51) Int. Cl.
*H01M 2/10* (2006.01)
*B25B 21/00* (2006.01)

(52) U.S. Cl.
CPC ..... *A45F 2200/0575* (2013.01); *B25B 21/007* (2013.01); *H01M 2220/30* (2013.01)

(58) Field of Classification Search
USPC ........................................................ 224/268
See application file for complete search history.

(56) References Cited

U.S. PATENT DOCUMENTS

| | | | |
|---|---|---|---|
| 5,810,232 A * | 9/1998 | Meurer | A45F 5/02 224/270 |
| 6,269,993 B1 * | 8/2001 | Ebejer | A45F 5/02 224/269 |
| 6,299,041 B1 | 10/2001 | Pitisi et al. | |
| 6,702,506 B2 | 3/2004 | Iitsuka | |
| 6,835,032 B1 | 12/2004 | Pozgay et al. | |
| D512,891 S * | 12/2005 | Aglassinger | D8/68 |
| 6,994,238 B2 * | 2/2006 | Estabaya | A45F 5/02 224/247 |
| 7,175,061 B2 * | 2/2007 | Dohn | A45F 5/02 224/241 |
| 7,222,767 B1 * | 5/2007 | Yang | A45F 5/021 173/170 |
| D567,615 S * | 4/2008 | Taniguchi | D8/68 |
| D610,421 S * | 2/2010 | Taniguchi | D8/68 |
| D614,468 S * | 4/2010 | Aglassinger | D8/68 |
| D628,038 S * | 11/2010 | Aoki | D8/68 |
| 8,167,056 B2 * | 5/2012 | Ito | B25H 3/006 173/171 |
| 8,231,039 B2 | 7/2012 | Buck et al. | |
| D691,444 S * | 10/2013 | Tirone | D8/68 |
| 8,910,728 B2 * | 12/2014 | Okuda | B25F 5/02 173/171 |
| D721,938 S * | 2/2015 | Aoki | D8/68 |
| 8,960,635 B2 * | 2/2015 | Brendel | B25F 5/02 224/268 |
| 9,038,873 B2 * | 5/2015 | Moreau | A45F 5/00 224/269 |
| D820,656 S * | 6/2018 | Waldron | D8/68 |
| D840,778 S * | 2/2019 | Waldron | D8/68 |
| 2002/0122707 A1 * | 9/2002 | Sakai | B25B 23/045 408/241 R |
| 2003/0066666 A1 * | 4/2003 | Etter | B25F 5/02 173/170 |
| 2004/0115525 A1 | 6/2004 | Kuo | |
| 2005/0133552 A1 | 6/2005 | Lawrence | |
| 2006/0091168 A1 | 5/2006 | Ng | |
| 2006/0104735 A1 | 5/2006 | Zeller et al. | |
| 2007/0102176 A1 * | 5/2007 | Liao | B25F 5/00 173/170 |
| 2007/0181627 A1 | 8/2007 | Simonin | |
| 2009/0278012 A1 | 11/2009 | Okouchi et al. | |
| 2010/0031781 A1 * | 2/2010 | Ito | B25F 5/02 81/57.4 |
| 2011/0139479 A1 * | 6/2011 | Nagasaka | B25F 5/02 173/217 |
| 2014/0097217 A1 * | 4/2014 | Walsh | A45F 5/021 224/268 |

FOREIGN PATENT DOCUMENTS

| | | |
|---|---|---|
| CA | 2 561 949 A1 | 10/2005 |
| CA | 2 561 960 A1 | 10/2005 |
| CA | 2 563 223 C | 10/2005 |
| DE | 202014102425 U1 | 6/2014 |
| EP | 1 001 546 B1 | 5/2000 |
| EP | 1 344 609 A1 | 9/2003 |
| EP | 1 740 070 B1 | 1/2007 |
| EP | 2308651 A1 | 4/2011 |
| JP | 2004-174647 A | 6/2004 |
| WO | 2004-048046 A1 | 6/2004 |
| WO | 2005-097415 A2 | 10/2005 |
| WO | 2005-099512 A1 | 10/2005 |
| WO | 2012113443 A1 | 8/2012 |

OTHER PUBLICATIONS

Australian Patent Office Action for Application No. 2018202292, dated Mar. 1, 2019, 4 pages.

* cited by examiner

BELT CLIP FOR POWER TOOL

CROSS-REFERENCE TO RELATED APPLICATIONS

This application claims priority to U.S. Provisional Application Nos. 62/478,394, filed Mar. 29, 2017, and 62/581,106, filed and Nov. 3, 2017, the entire contents of each are hereby incorporated by reference.

BACKGROUND

The present invention relates to power tools, and more particularly to a belt clip for a power tool.

While operating a power tool, an operator may need to set aside the power tool in order to have both hands accessible in certain situations. However, setting aside a power tool can be cumbersome and/or dangerous if the operator is, for example, on an elevated work surface (e.g., a ladder, a roof, scaffolding, etc.) or the operator is unable to maneuver while supporting another workpiece (e.g., drywall, lumber, cabinets, etc.). Also, an operator may misplace the power tool when moving around a job site or become inefficient while trying to relocate/collect the power tool.

Some power tools (e.g., drill drivers, nailers, etc.) are equipped with a belt clip for allowing an operator to store the power tool on the operator's tool belt or tool bag. As such, an operator benefits from the portability of the tool, convenience of storing the tool when not in use, and avoiding potentially dangerous situations.

SUMMARY

In one embodiment, the invention provides a belt clip for use with a power tool. The power tool includes a tool housing, a battery receptacle positioned adjacent the tool housing, and a battery selectively received within the battery receptacle. The belt clip includes a body with a first member that has a first portion and a connecting portion. The first portion is received in a complementary groove on an interior surface of the battery receptacle and the connecting portion is substantially perpendicular to the first portion and is configured to extend between the battery receptacle and the battery. The body also includes a second member that is coupled to the first member. The second member is configured to be spaced apart from an exterior of the power tool.

In another embodiment, the invention provides a power tool including a tool housing, a battery receptacle positioned adjacent the tool housing, a battery selectively received within the battery receptacle, and a belt clip removably coupled to the battery receptacle. The belt clip includes a body with a first member that has a first portion and a connecting portion. The first portion is received in a complementary groove on an interior surface of the battery receptacle and the connecting portion is substantially perpendicular to the first portion and is configured to extend between the battery receptacle and the battery. The body also includes a second member that is coupled to the first member. The second member is configured to be spaced apart from an exterior of the power tool.

In another embodiment, the invention provides a method of coupling a belt clip, which has a body having a first member coupled to a second member, to a power tool, which has a tool housing, a battery receptacle positioned adjacent the tool housing, and a battery selectively received within the battery receptacle. The method includes coupling the first member to an interior surface of the battery receptacle such that the second member is spaced apart from an exterior of the power tool, and securing the body to the power tool by securing the battery pack to the battery receptacle.

In another embodiment, the invention provides a belt clip for a power tool. The power tool includes a tool housing for receiving a battery therein. The belt clip includes a main body having a first member, a second member, and a third member that are all oriented substantially parallel to each other. The first member is disposed within the interior of the tool housing between the battery and the tool housing. The second member is disposed on the exterior of the tool housing. The third member is spaced away from the tool housing to define a gap configured to receive a tool belt. The main body is coupleable to and removeable from the tool housing without the use of fasteners.

In some embodiments, the second member is flush with the exterior of the tool housing.

In some embodiments, the first member includes an aperture that receives a corresponding projection extending away from the interior of the tool housing.

In some embodiments, the second member includes an aperture that receives a corresponding projection extending away from the exterior of the tool housing.

In some embodiments, the third member is resiliently coupled to the second member such that the third member is movable relative to the second member.

In some embodiments, the main body is inhibited from being removed from the tool housing when the battery is coupled to the tool housing.

In some embodiments, the main body is permitted to be removed from the tool housing when the battery is removed from the tool housing.

In another aspect, the invention provides a power tool including a tool housing, a battery selectively received within the tool housing, and a clip having a main body that is coupled to the tool housing without the use of fasteners. The battery interfaces with the clip when the battery is coupled to the tool housing to inhibit the clip from being removed from the tool housing.

In some embodiments, the clip includes a first member, a second member, and a third member.

In some embodiments, the first member is coupled between the tool housing and the battery.

In some embodiments, the first member includes an aperture that receives a corresponding projection extending away from an interior of the tool housing.

In some embodiments, the second member is disposed on an exterior of the tool housing.

In some embodiments, the second member includes an aperture that receives a corresponding projection extending away from the exterior of the tool housing.

In some embodiments, the second member is flush with an exterior of the tool housing to avoid inadvertent snagging or catching of the second member on a tool belt.

In some embodiments, the third member is spaced apart from the tool housing to define a gap configured to receive a tool belt.

In some embodiments, the third member is resiliently coupled to the second member such that the third member is movable relative to the second member.

In yet another aspect, the invention provides a power tool including a tool housing, a battery selectively received within the tool housing, and a clip having a main body that is coupled to the tool housing without the use of fasteners. The clip is inhibited from being removed from the tool housing when the battery is coupled to the tool housing. The clip is permitted to be removed from the tool housing when the battery is removed from the tool housing.

In some embodiments, the clip includes a first member, a second member, and a third member, wherein the first member is coupled to the tool housing on an interior surface of the housing.

In some embodiments, the clip includes a first member, a second member, and a third member, wherein the second member is coupled to the tool housing on an exterior surface of the housing.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
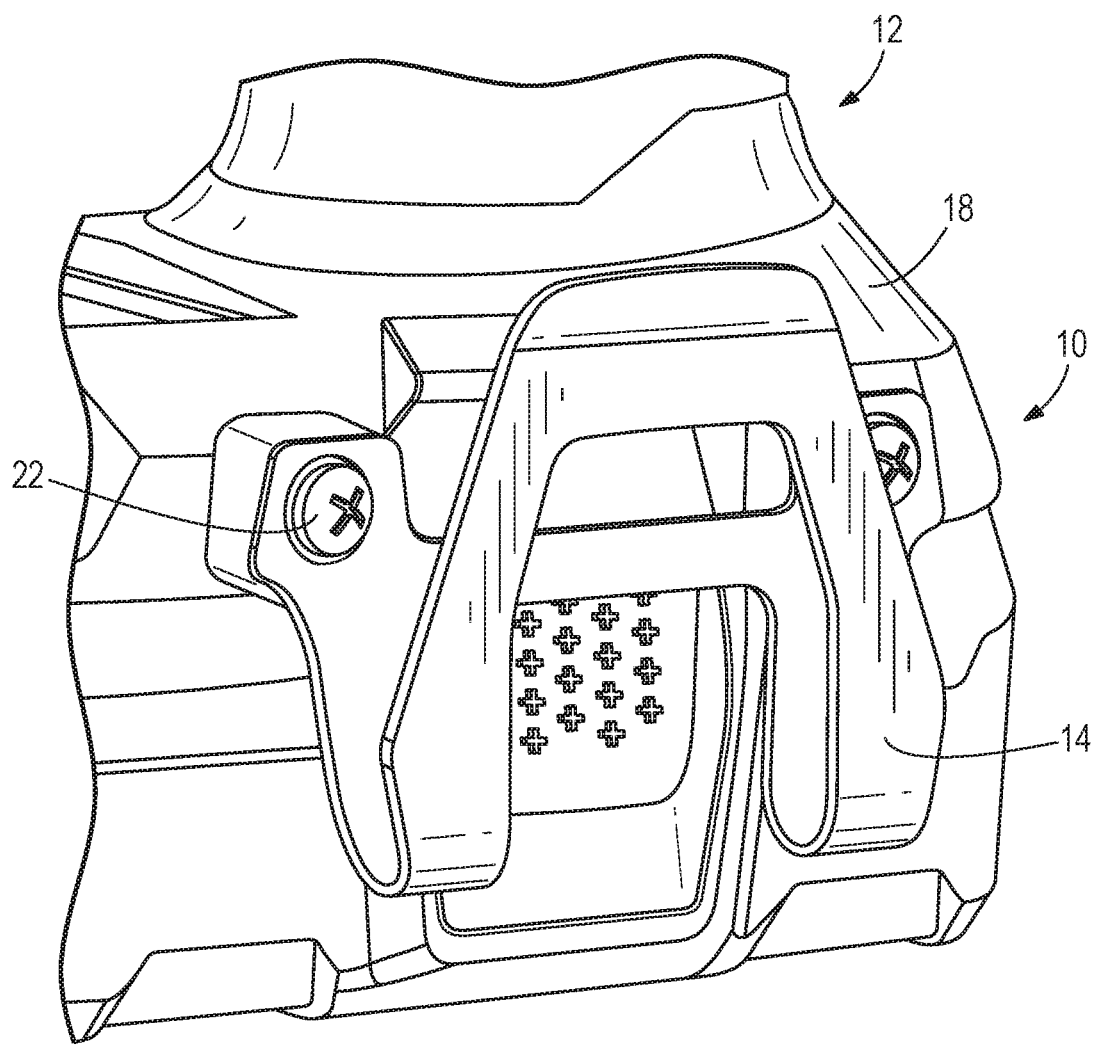
FIG. 1 is a perspective view of a prior art belt clip secured to a power tool.

FIG. 1 illustrates a prior art belt clip 10 for a power tool 12. As shown, the belt clip 10 includes a body 14 that is coupled to a tool housing 18 with fasteners 22 (e.g., screws). Although including the belt clip 10 on a power tool 12 is convenient for purposes of maintaining the power tool 12 in close proximity to the operator, using fasteners 22 for coupling the belt clip 10 to the power tool 12 can be inconvenient. Specifically, an operator is required to use a separate tool when an operator desires to reposition the belt clip 10 relative to the power tool 12 or remove the belt clip 10 entirely from the power tool 12.

Figure 2:
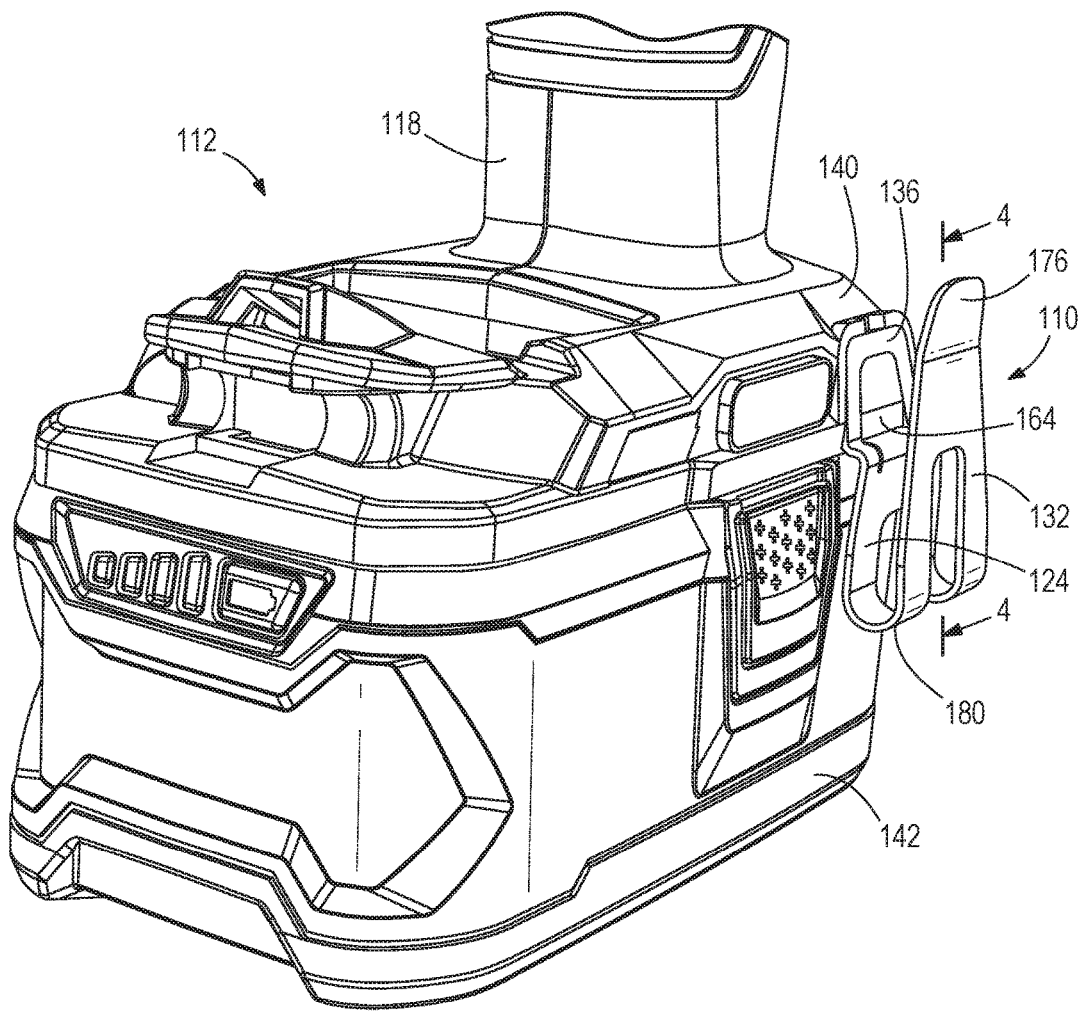
FIG. 2 is a front perspective view of a power tool including a belt clip according to an embodiment of the invention.
Figure 3:
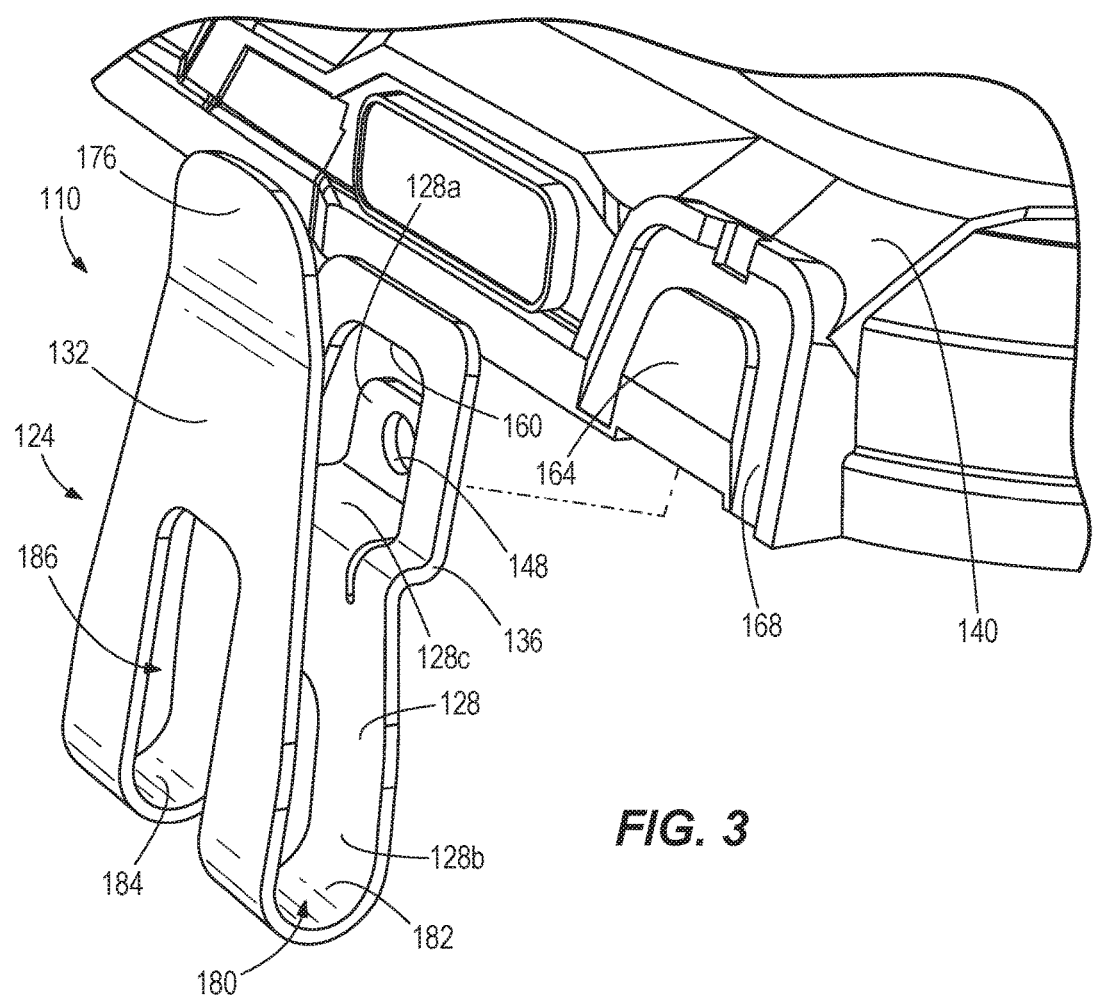
FIG. 3 is an exploded view of the power tool of FIG. 2, illustrating the belt clip removed from the power tool.

With reference to FIGS. 2 and 3, a power tool 112 includes a belt clip 110 according to an embodiment of the proposed invention. The power tool 112 is, for example, a drill/driver but could alternately be any other type of power tool. The power tool 112 also includes a tool housing 118, a battery receptacle 140 disposed adjacent the tool housing 118, and a battery 142 selectively received within the battery receptacle 140 to provide power to the power tool 112.

The belt clip 110 includes a body 124 that is a monolithic component, which means a component including no subparts that move with respect to each other. In other embodiments, the body 124 could be formed from multiple, separate components that couple together. The body 124 forms three main components, which include a first member 128, a second member 132, and an auxiliary member 136. Each of the three members 128, 132, 136 of the illustrated embodiment are bent no greater than 10 degrees with respect to each other. In other words, the three members 128, 132, 136 are substantially parallel relative to each other.

Figure 4:
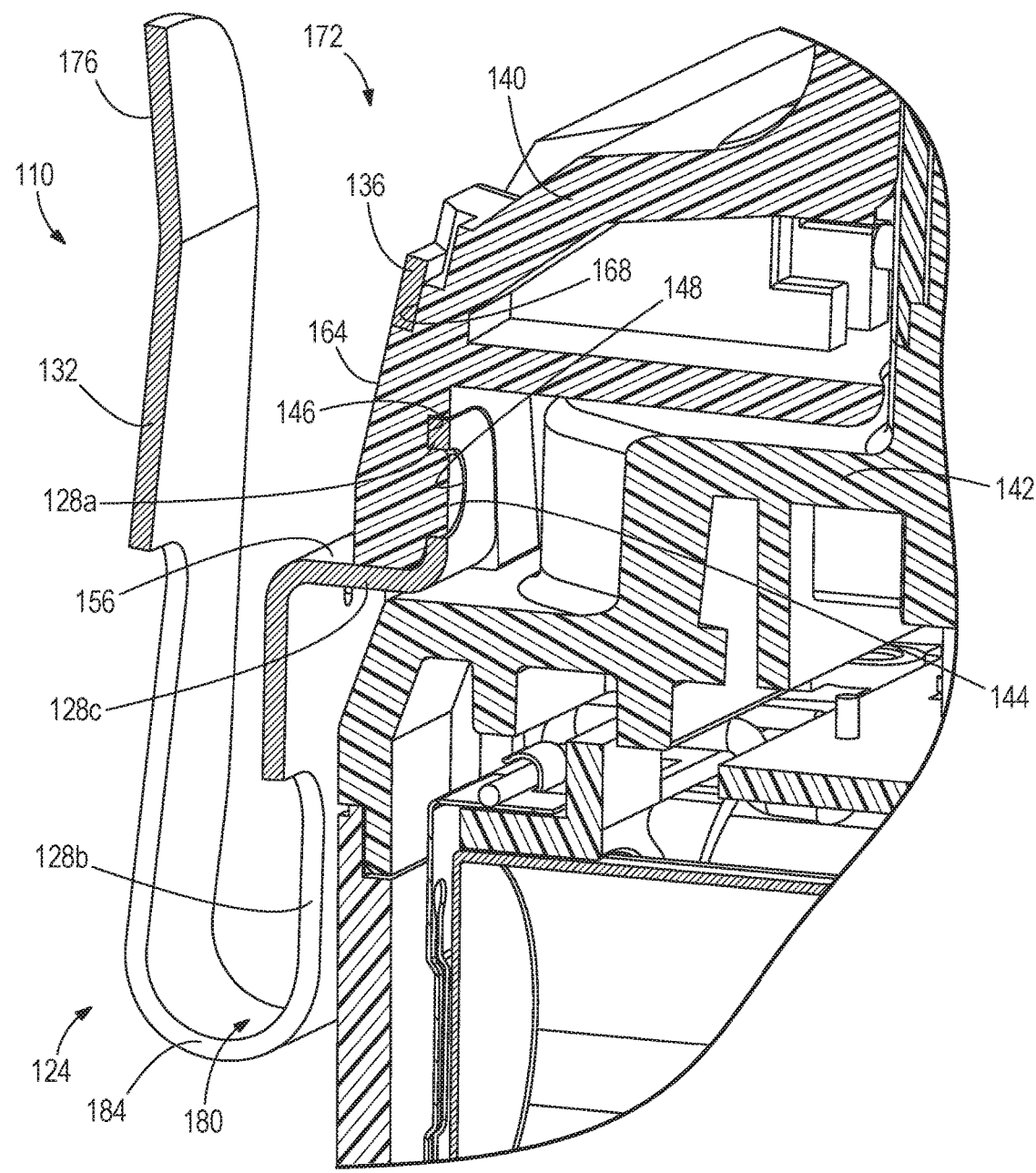
FIG. 4 is cross-sectional view of the power tool taken along line 4-4 of FIG. 2.

With reference to FIGS. 3 and 4, the first member 128 includes a first portion 128a, a second portion 128b, and a connection portion 128c that couples the first portion 128a and the second portion 128b. The first portion 128a is configured to be positioned within an interior of the power tool 112, and more particularly, within the battery receptacle 140 of the power tool 112 when the belt clip 110 is coupled to the power tool 112. As shown in FIG. 4, an interior surface of the battery receptacle 140 has a first projection 144 that extends away from an inner periphery of the battery receptacle 140 and a recess or groove 146 that surrounds the first projection 144. The first portion 128a includes an aperture 148 that extends therethrough. The first portion 128a is sized and shaped to be received by the groove 146 such that the aperture 148, which is complementary to the first projection 144, receives the first projection 144. Although the aperture 148 and the first projection 144 of the illustrated embodiment are circular shaped, in other embodiments, the aperture 148 and the first projection 144 may be alternatively shaped as long as the aperture 148 is capable of receiving the projection 144.

Further with respect to FIGS. 3 and 4, the connecting portion 128c is oriented perpendicularly relative to both the first portion 128a and the second portion 128b of the first member 128. Although not shown, the connecting portion 128c may be oriented at any number of various acute angles relative to the first and second portions 128a, 128b in other embodiments. Also, the connecting portion 128c abuts a portion of the battery receptacle 140, thereby defining a stop surface 156 to facilitate a proper connection between the belt clip 110 and the power tool 112.

With continued reference to FIGS. 3 and 4, an auxiliary member 136 is coupled to the first member 128. The auxiliary member 136 includes a through-hole 160 that receives (e.g., by a snap-fit type of engagement) a second projection 164 on the exterior of the battery receptacle 140. The through-hole 160 and the second projection 164 create a detent-type mechanism that eliminates the need for fasteners to secure the belt clip 110 to the power tool 112. When the belt clip 110 is coupled to the power tool 112, the auxiliary member 136 is received within a corresponding groove or recess 168 on the exterior of the battery receptacle 140. The depth of the recess 168 is the same depth of the auxiliary member 136, such that the auxiliary member 136 remains flush with an exterior of the power tool housing 118 when the belt clip 110 is coupled to the power tool 112 to avoid inadvertent snagging or catching of the auxiliary member 136 on clothes, belts, bags, etc.

Although the illustrated embodiment includes the first projection 144 and the second projection 164, in other embodiments, the power tool 112 may include only one of the first and second projections 144, 164 for coupling the belt clip 110 to the power tool 112. In further embodiments, one or more projections may be provided on the belt clip 110 and one or more corresponding apertures may be provided on the power tool 112 to provide a snap-fit type of engagement between the belt clip 110 and the power tool 112.

With continued reference to FIGS. 3 and 4, the second member 132 is positioned exteriorly of the power tool 112. Specifically, the second member 132 is spaced apart from the exterior of the power tool 112 to provide a gap 172 between the tool 112 and the second member 132. The gap 172 is provided to accommodate a tool belt when the tool 112 is suspended from the tool belt of an operator. The second member 132 includes an angled portion 176 disposed at the distal end of the second member 132. The angled portion 176 angles away from the tool 112 and is primarily intended to increase the size of the gap 172, thereby easing or guiding the entry of the tool belt into the gap 172. Lastly, a bend 180 (e.g., a U-shaped portion) is positioned between and couples the first member 128 and the second member 132. As shown in FIGS. 2-4, the bend 180 is formed by a first arched segment 182 between a first side of the second portion 128b and a first side of the second member 132, and a second arched segment 182 between a second side of the second portion 128b and a second side of the second portion 132. The arched segments 182, 184 are spaced apart from each with a gap 186 therebetween. In other embodiments, the bend 180 may be a single arched segment between the second portion 128b and the second member 132. Each arched segment 182, 184 acts substantially as a spring to allow the second member 132 to move relative to the first member 128. In other words, the second member 132 is capable of moving relative to the tool 112 due to the bend 180 in order to accommodate different sized tool belts.

In operation, the belt clip 110 is configured to hold the power tool 112 in close proximity to an operator by coupling the belt clip 110 to an article of clothing, a tool belt, a tool bag, or other similar object. To couple the belt clip 110 to the power tool 112, an operator removes the battery 142 and positions the first portion 128a within the battery receptacle 140 in a manner that the aperture 148 receives the first projection 144 and the groove 146 receives the first portion 128a. At this point, the belt clip 110 is manipulated so that the auxiliary member 136 slides over the second projection 164 until the auxiliary member 136 is received within the recess 168 and the through-hole 160 receives the second projection 164. The battery 142 can be reattached to the power tool 112. When the battery 142 is coupled to the power tool 112, the belt clip 110 is inhibited from being removed. That is, the battery 142 interfaces with the belt clip 110 in a manner that inhibits the first projection 144 from being removed from the aperture 148. When the battery 142 is detached from the tool 112, the belt clip 110 is still coupled to the power tool 112 via the first and second projections 144, 164. However, the belt clip 110 is permitted to be removed or repositioned on the tool 112 at this time.

Although the first projection 144, the groove 146, the second projection 164, and the recess 168 are only illustrated on one side of the battery receptacle 140, the same components are duplicated on the opposite side of the battery receptacle 140 so the belt clip 110 can be coupled to the tool 112 on either side of battery receptacle 140. In other embodiments, the first projection 144, the groove 146, the second projection 164, and the recess 168 could further be included on the rear-end and the forward-end of the battery receptacle 140.

Figure 5:
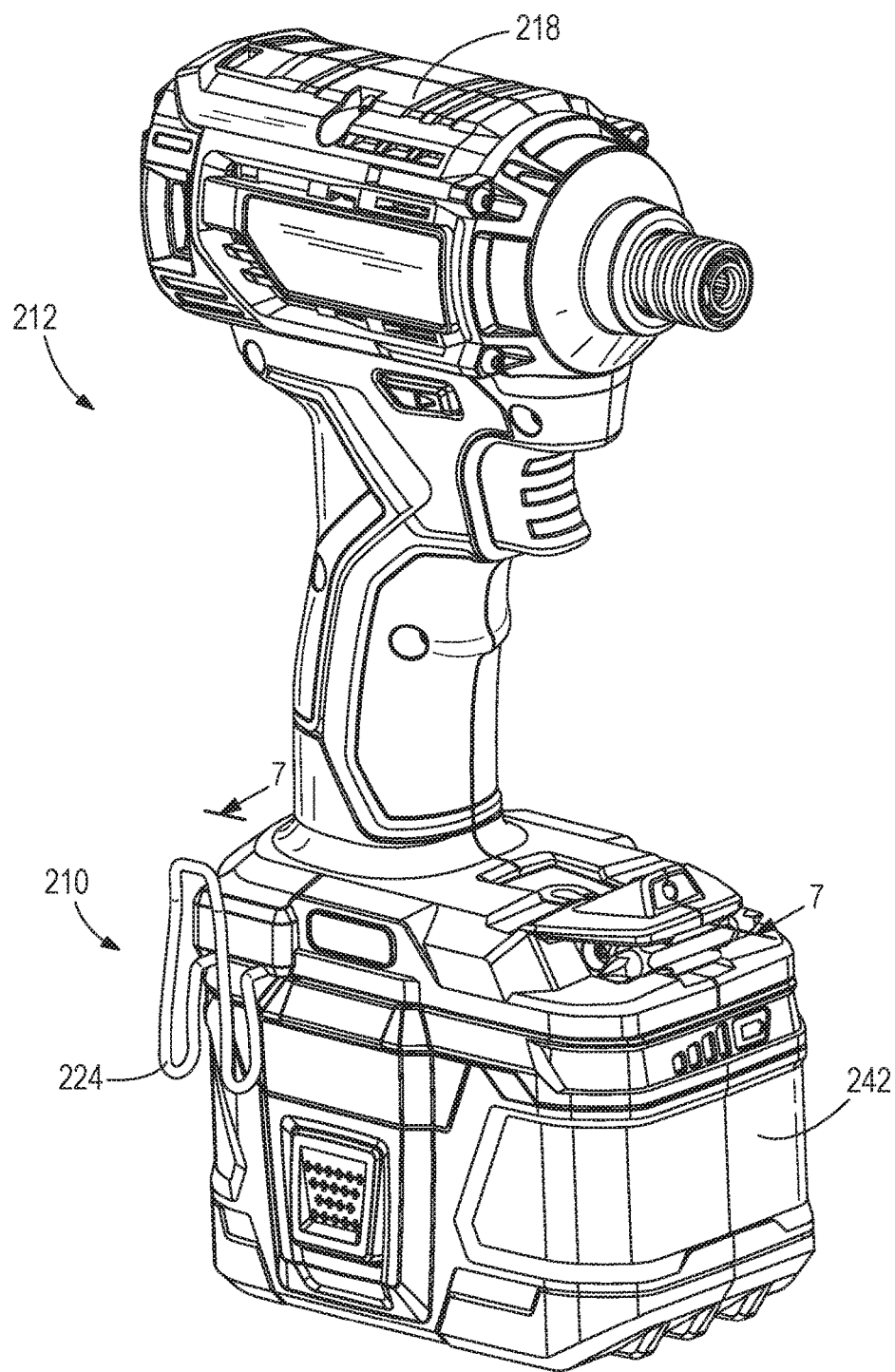
FIG. 5 is a perspective view of another belt clip secured to a power tool.
Figure 6:
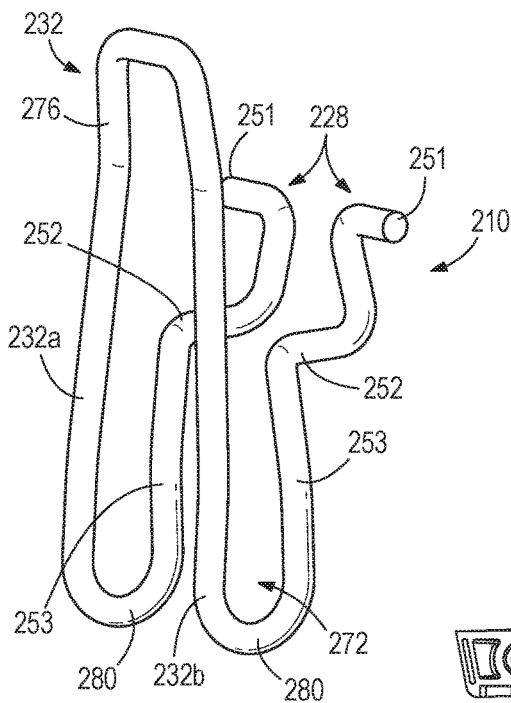
FIG. 6 is a perspective view of the belt clip of FIG. 5.
Figure 7:
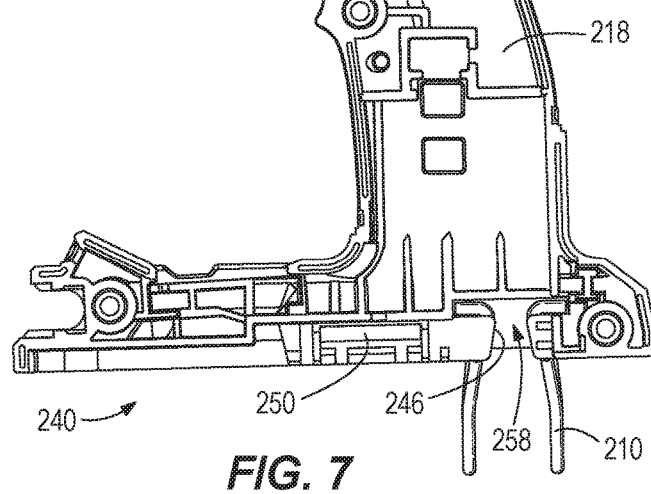
FIG. 7 is cross-sectional view of the power tool taken along line 7-7 of FIG. 5.

With reference to FIGS. 5-7, a power tool 212 includes a belt clip 210 according to another embodiment of the proposed invention. Like the power tool 112 of FIGS. 1-2, the power tool 212 is, for example, a drill/driver, but could alternately be any other type of power tool. The power tool 212 includes a tool housing 218, a battery receptacle 240 (FIG. 7) disposed adjacent the tool housing 218, and a battery 242 selectively received within the battery receptacle 240 to provide power to the power tool 212. With reference to FIG. 7, the tool housing 218 includes a groove 246 that is T-shaped on an interior surface 250.

With reference to FIG. 6, the belt clip 210 includes a body 224 that is a monolithic component. In the illustrated embodiment, the body 224 includes a wire frame. In other embodiments, the body 224 could be formed from multiple, separate components that couple together or could be constructed of another material. The body 224 forms two main components, which include a pair of first members or legs 228 and a second member 232. One of the pair of legs 228 is connected to a first side 232a of the second member 232 and the other of the pair of legs 228 is connected to a second side 232b of the second member 232, as will be discussed in greater detail below. Each of the pair of legs 228 of the illustrated embodiment are bent no greater than 10 degrees with respect to the second member 232. In other words, the pair of legs 228 are substantially parallel relative to the second member 232.

Further with respect to FIG. 6, a first portion 251 of each of the pair of legs 228 is positioned within an interior of the power tool 212, and more particularly, within the groove 246 of the power tool 212 when the belt clip 210 is coupled to the power tool 212. As shown herein, the pair of legs 228 includes complimentary first portions 251. In particular, the first portion 251 of one of the pair of legs 228 is shaped substantially like a seven, and the first portion 251 of the other of the pair of legs 228 is shaped like a backwards seven. In additional or alternative embodiments, the first portions 251 may have other configurations and shapes. Each of the legs 228 further includes a connecting portion 252 that connect the first portion 251 and a second portion 253 of each of the respective legs 228. Each of the connecting portions 252 is oriented substantially perpendicularly relative to the respective leg 228. Although not shown, the connecting portions 252 may be oriented at any number of various acute angles relative to the legs 228 in other embodiments. Also, the connecting portions 252 abut a portion of the tool housing 218, thereby defining a stop surface to facilitate a proper connection between the belt clip 210 and the power tool 212.

With continued reference to FIG. 6, the second member 232 is positioned exteriorly of the power tool 212. Specifically, the second member 232 is spaced apart from the exterior of the power tool 212 to provide a gap 272 between the tool 212 and the second member 232. The gap 272 is provided to accommodate a tool belt when the tool 212 is suspended from the tool belt of an operator. The second member 232 includes an angled portion 276 disposed at the distal end of the second member 228. The angled portion 276 angles away from the tool 212 and is primarily intended to increase the size of the gap 272, thereby easing or guiding the entry of the tool belt into the gap 272. Lastly, the second portion of each of the pair of legs 228 is coupled to the respective sides 232a, 232b of the second member 232 by a bend 280 (e.g., U-shaped portion). The bends 280 act substantially as a spring to allow the second member 232 to move relative to the legs 228. In other words, the second member 232 is capable of moving relative to the tool 212 due to the bends 280 in order to accommodate different sized tool belts.

In operation, the belt clip 210 is configured to hold the power tool 212 in close proximity to an operator by coupling the belt clip 210 to an article of clothing, a tool belt, a tool bag, or other similar object. To couple the belt clip 210 to the power tool 212, an operator removes the battery 242 and positions the legs 228 within the groove 246. In particular, the operator exerts a force on the legs 228 to move them toward one another and advances the first portions 251 of the legs 228 through an opening 258 that connects with the groove 246. The legs 228 are biased away from one another, and therefore when the operator releases the legs 228, the legs 228 will move away from other another and into the groove 246. The battery 242 can then be reattached to the power tool 212. Together, the groove 246 and the legs 228 eliminate the need for fasteners to secure the belt clip 210 to the power tool 212. Although the belt clip 210 is inhibited from being removed when it is secured within the groove 246, recoupling the battery 242 to the power tool 212 reinforces the connection between the belt clip 210 and power tool 212. That is, the battery 242 interfaces with the belt clip 210 in a manner that inhibits the legs 228 from being removed from the groove 246. Accordingly, when the battery 242 is detached from the tool 212, the belt clip 210 is still coupled to the power tool 212, but the belt clip 210 is permitted to be removed or repositioned on the tool 212 at this time.

Figure 8:
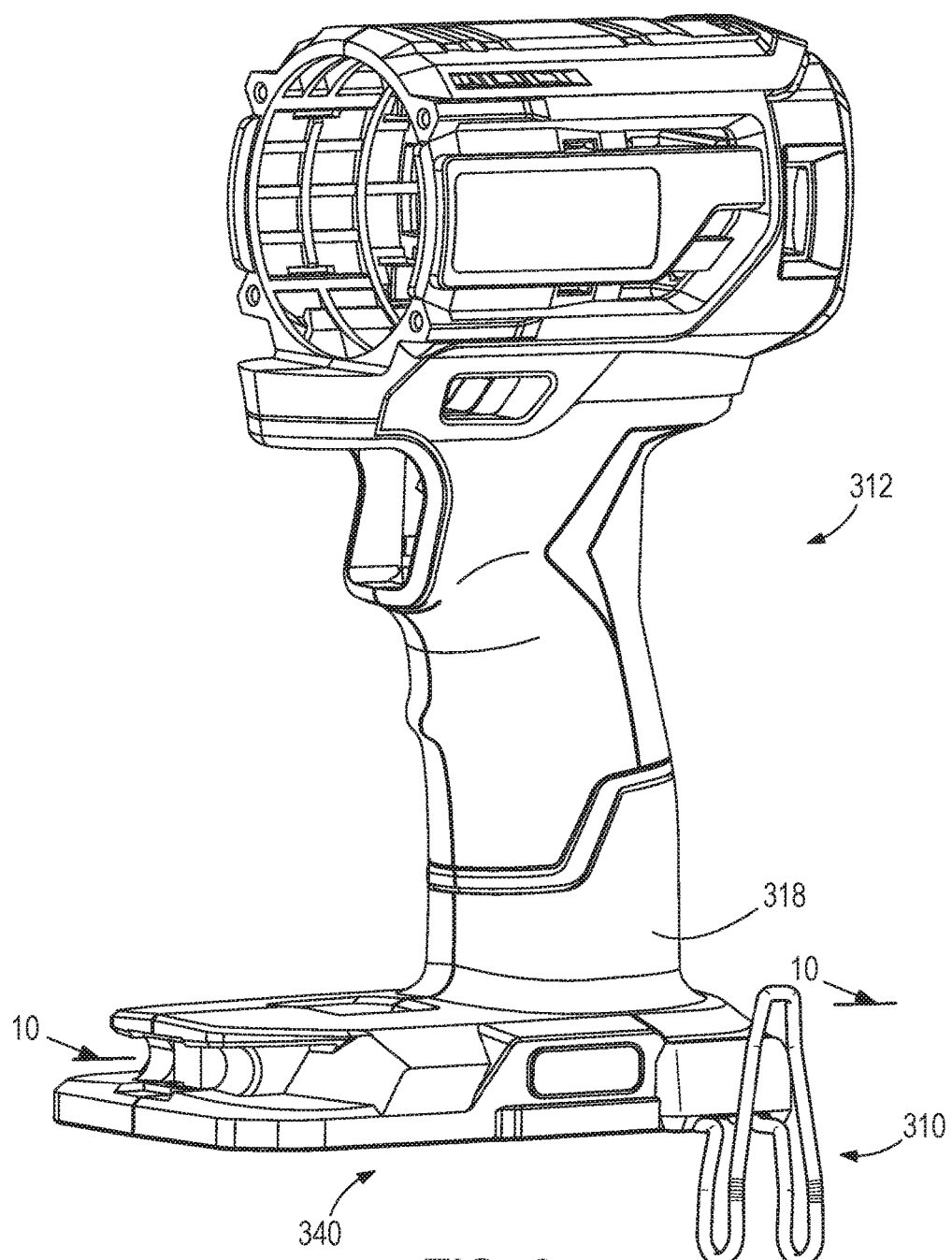
FIG. 8 is a perspective view of another belt clip secured to a power tool.
Figures 9, 10:
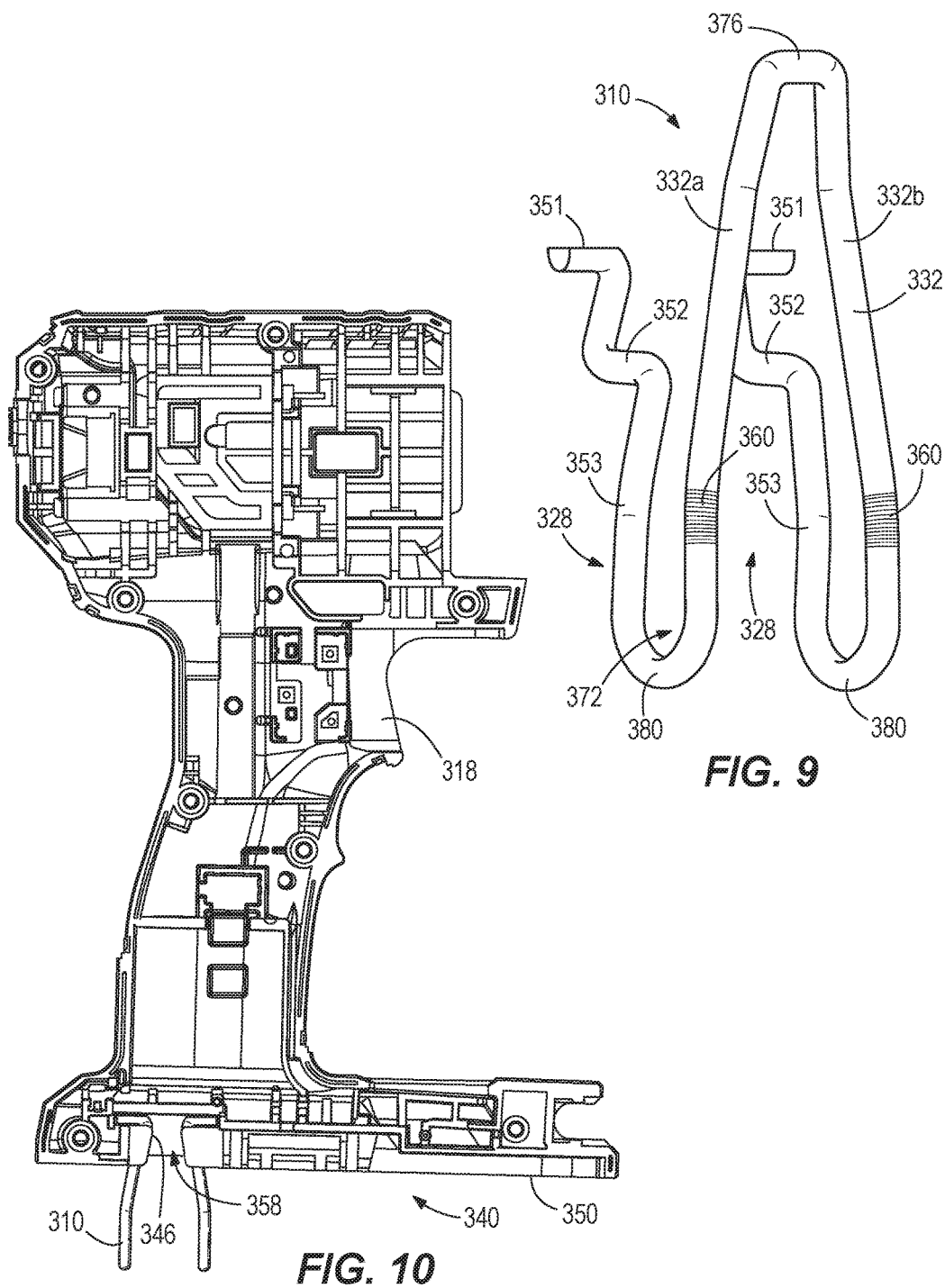
FIG. 9 is a perspective view of the belt clip of FIG. 8.
FIG. 10 is cross-sectional view of the power tool taken along line 10-10 of FIG. 8.

FIGS. 8-10 illustrate a belt clip 312 according to another embodiment of the invention. The belt clip of FIGS. 8-10 is similar to the belt clip 212 of FIGS. 5-7; therefore, like structures are identified by like reference numbers plus "100" and only the differences will be discussed hereafter. In particular, the first portions 351 of the pair of legs 312 include planar surfaces. Additionally, each of the first and second sides 332*a*, 332*b* of the second member 328 includes a spring portion 360. The spring portions 360 give the second member 328 additional flexibility when in use.

Although the invention has been described in detail with reference to certain preferred embodiments, variations and modifications exist within the scope and spirit of one or more independent aspects of the invention as described.

Various features and advantages of the invention are set forth in the following claims.

What is claimed is:

1. A power tool comprising:
    a tool housing;
    a battery pack receptacle positioned adjacent the tool housing and defining a cavity, the battery pack receptacle including a first surface that faces the cavity and a second surface that is opposite the cavity;
    a battery pack selectively received within the cavity of the battery pack receptacle; and
    a belt clip removably coupled to the battery pack receptacle and having a body, the body including
        a first member including a first portion and a connecting portion, the first portion being received in a complementary groove on the first surface of the battery pack receptacle such that the first portion is positioned between the first surface of the battery pack receptacle and the battery pack, the connecting portion coupled to the first portion and extending outwardly from the battery pack receptacle;
        a second member coupled to the connecting portion of the first member, the second member configured to be space apart from an exterior of the power tool; and
        wherein the first member of the belt clip is one of a pair of first members, each of the pair of first members including a first portion and a connecting portion, the first portion of each of the pair of first members being received in a complementary groove on the first surface of the battery pack receptacle such that the first portion of each of the pair of first members is positioned between the first surface of the battery pack receptacle and the battery pack, the connecting portion of each of the pair of first members is coupled to the respective first portion, the connecting portion of each of the pair of first members extending outwardly from the battery pack receptacle.

2. The power tool of claim 1, wherein the body of the belt clip is removably secured to the power tool without a fastener.

3. The power tool of claim 1, wherein the first member of the belt clip is coupled to the second member of the belt clip by a substantially U-shaped portion.

4. The power tool of claim 1, wherein the second member of the belt clip includes a first side that is coupled to the connecting portion of one of the pair of first members by a U-shaped portion and a second side that is coupled to the connecting portion of the other of the pair of first members by a U-shaped portion.

5. The power tool of claim 1, wherein the pair of first members of the belt clip are biased away from one another.

6. A method of coupling a belt clip to a power tool, the power tool including a tool housing, a battery pack receptacle positioned adjacent the tool housing, and a battery pack selectively received within the battery pack receptacle, the belt clip including a body having a first member coupled to a second member, the method comprising:
    coupling the first member to an interior surface of the battery pack receptacle such that the second member is spaced apart from an exterior of the power tool; and
    securing the body to the power tool by securing the battery pack to the battery pack receptacle such that the first member is received in a space between the interior surface of the battery pack receptacle and the battery pack; and wherein securing the body to the power tool includes securing the body without a fastener.

7. The method of claim 6, wherein coupling the first member to an interior surface of the battery pack receptacle includes inserting a first portion of the first member into a complementary groove on the interior surface of the battery pack receptacle.

8. The method of claim 7, wherein coupling the first member to an interior surface of the battery pack receptacle includes positioning a connecting portion adjacent a different surface of the battery pack receptacle.

* * * * *